United States Patent [19]
Harris et al.

[11] Patent Number: 6,084,016
[45] Date of Patent: *Jul. 4, 2000

[54] COMPOSITIONS FOR FORMING GOLF BALLS CONTAINING OXA ACIDS

[75] Inventors: Kevin M. Harris, New Bedford; Murali Rajagopalan, South Dartmouth, both of Mass.

[73] Assignee: Acushnet Company, Fairhaven, Mass.

[ * ] Notice: This patent is subject to a terminal disclaimer.

[21] Appl. No.: 09/225,341

[22] Filed: Jan. 5, 1999

Related U.S. Application Data

[63] Continuation of application No. 08/828,636, Mar. 31, 1997, Pat. No. 5,856,388, which is a continuation-in-part of application No. 08/482,520, Jun. 7, 1995, Pat. No. 5,616,640.

[51] Int. Cl.$^7$ ...................................................... C08K 5/09
[52] U.S. Cl. ......................... 524/320; 473/354; 473/365; 473/371; 473/372; 473/373; 473/374; 473/378; 473/385
[58] Field of Search .............................. 524/320; 473/371, 473/372, 373, 374, 378, 385, 354, 365

[56] References Cited

U.S. PATENT DOCUMENTS

| | | | |
|---|---|---|---|
| 2,183,853 | 12/1939 | Haussmann . | |
| 5,306,760 | 4/1994 | Sullivan | 524/400 |
| 5,856,388 | 1/1999 | Harris . | |

FOREIGN PATENT DOCUMENTS 0276956  8/1988  European Pat. Off. .

*Primary Examiner*—David Buttner
*Attorney, Agent, or Firm*—Pennie & Edmonds LLP

[57] ABSTRACT

A golf ball comprising a cover and a core, and optionally at least one intermediate layer interposed between the cover and the core, wherein the cover, the intermediate layer or both are formed from a blend comprising an oxa acid compound having the formula

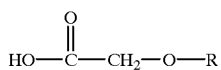

wherein R is an organic moiety selected from the group consisting of alkyl, carbocyclic, and heterocyclic groups. Additionally, the present invention is directed towards a golf ball cover and/or intermediate layer formed from a blend comprising at least two components, the first component comprising at least one oxa acid composition of Formula I, while the second component is a polyurethane, epoxy resin, polyethylene, polyamide, polyester, and an acid copolymer or its ionomer derivatives or mixtures thereof.

18 Claims, No Drawings

COMPOSITIONS FOR FORMING GOLF BALLS CONTAINING OXA ACIDS

CROSS REFERENCE TO RELATED APPLICATIONS

This is a continuation of application No. 08/828,636, filed Mar. 31, 1997, now Pat. No. 5,856,388, which is a Continuation-In-Part of U.S. patent application Ser. No. 08/482,520 filed on Jun. 7, 1995, now Pat. No. 5,616,640.

FIELD OF INVENTION

The present invention is directed toward novel blends comprising at least one oxa acid compound for forming golf ball cover layers and/or intermediate layers located between the cover and the core and golf balls formed with said layers.

BACKGROUND OF THE INVENTION

Throughout its history, the golf ball has undergone an extensive evolution in an effort to improve its play-related characteristics such as durability, distance, and control. The first golf balls appeared around the 14th century and consisted of a leather sack which had been soaked in water and subsequently filled with wet feathers. As the sack dried, the leather would contract and the feathers expanded, resulting in a very hard mass which was then hammered into a round ball. These "feathery" golf balls were in use until about the mid 19th century, when a single piece golf ball made from "gutta percha" was introduced. Gutta percha is a rubber like material which is made from a type of tree sap, and at the time was primarily used as a packing material. The gutta percha balls were found to be more durable than the feathery balls, but did not offer the same distance as the older balls.

After the introduction of the gutta percha balls, it was discovered that a ball's flight was notably longer and more accurate after the surface had been nicked and scratched during use. Accordingly, golf ball manufacturers developed a number of methods for providing balls with a gutta percha cover that had a variety of patterns of nicks or markings on the surface. This eventually lead to the complex dimple patterns which are in use on golf balls today.

In the early 1900's, the wound rubber ball was introduced, which was considered a major breakthrough in the design of golf balls. It consisted of a ball in which a rubber thread was tightly wound around a solid rubber core, which wound core was then encased in a gutta percha cover. The early wound rubber balls lacked uniformity in size and weight, but the ball had a livelier core and the golfer was better able to control the spin of the ball.

Modern day golf balls can be classified as one-piece, two-piece, and wound golf balls. One-piece balls are molded from a homogeneous mass of material with a dimple pattern molded therein. Such balls are inexpensive and very durable, but do not provide great distance because of their relatively high spin rate and low velocity. Two-piece balls are made by molding a cover about a solid core. These are the most popular types of balls in use today. These balls typically have a hard cut-resistant cover which gives a high distance ball, but one which has lower spin rates resulting in a decreased ability to control the ball. Wound balls are made by molding a cover about a wound core. The core is typically made of rubber and can be solid, semi-solid or have a liquid center. A wound core is prepared by winding a lengthy thin thread of elastic material about the center core. The wound core is then covered with a durable cover material. Wound balls are generally softer than one-piece and two-piece balls and provide more spin, resulting in increased control over the ball, but typically travel a shorter distance than a two piece ball. As a result of their more complex construction, wound balls generally require a longer time to manufacture and are more expensive to produce than two-piece balls.

The covers of "modern" golf balls are made from a variety of materials such as Balata, SURLYN, IOTEK and polyurethane. Balata (trans-polyisoprene) is a type of natural rubber and is one of the softest cover materials. For many years, balata was the standard cover stock material for most golf balls. Balata covered balls are favored among professionals and more advanced amateur players because the softness of the cover allows the player to achieve spin rates sufficient to more precisely control ball direction and distance, particularly on shorter approach shots.

However, balata covered balls are expensive and less durable as compared to the other covering materials. In particular, balata covered balls are susceptible to nicks or cuts as a result of a poorly swung golf club, which is not uncommon with the average recreational golfer. Such nicks or cuts detract from the flight characteristics imparted by the dimple patterns on the ball, rendering them of little use. Accordingly, alternate cover compositions have been developed in an attempt to provide spin rates and a feel approaching those of balata covered balls while also providing a golf ball with a higher durability and overall distance.

In the middle 1960's, E. I. DuPont de Nemours and Co. discovered a new species of resins known as ionomer resins. These resins are sold under various trademarks such as SURLYN™ and, to a large extent, have replaced balata as a cover stock material. Chemically, these ionomer resins are a copolymer of an olefin and an alpha, beta ethylenically unsaturated carboxylic acid with 10–90% of the carboxylic acid groups being neutralized by a metal ion. See U.S. Pat. No. 3,264,272. Presently, the only commercially available ionomer resins are copolymers of ethylene and methacrylic or acrylic acid. These ionomer resins are distinguished by the type of metal ion, the amount of acid, and the degree of neutralization.

Dunlop Rubber Company obtained the first patent on the use of SURLYN® for the cover of a golf ball, see U.S. Pat. No. 3,454,280 issued Jul. 8, 1969. Since then, there have been a number of disclosures on the use of these ionomer resins in the cover composition of a golf ball. See, for example, U.S. Pat. Nos. 3,819,768 issued Jun. 25, 1974; 4,323,247 issued Apr. 6, 1982; 4,526,375 issued Jul. 2, 1985; 4,884,814 issued Dec. 3, 1989; and 4,911,451 issued Mar. 27, 1990. However, while these golf balls possess virtually cutproof covers, they have inferior spin and feel properties as compared to balata covered balls.

In November 1986 DuPont introduced a sodium and zinc ionomer resin having a low flexural modulus and suggested using and blending the same with other ionomer resins for making a golf ball cover. Golf ball covers made from these low flexural modulus ionomer resins have improved spin and feel characteristics, but relatively low velocity.

In December of 1986, DuPont introduced a lithium ionomer resin which was a copolymer of ethylene and methacrylic acid. These lithium ionomer resins have a very high flexural modulus, typically about 60,000 psi (415 MPa). DuPont suggested that lithium ionomer resins could be used to produce a golf ball cover which would be more cut resistant and harder than a cover made with either sodium or zinc ionomer resins. DuPont also suggested that a golf ball having a cover made from a lithium ionomer resin would go farther, have a higher coefficient of restitution and be less prone to cutting (i.e., more durable) than a golf ball made from other known ionomer resins such as sodium and zinc ionomer resins and blends thereof. DuPont further suggested that lithium ionomer resins could be used in blends with other ionomer resins where they can impart better cut resistance to those other resins.

The United States Golf Association (USGA) has promulgated a rule that no golf ball shall have an initial velocity that exceeds 255 feet (78 m) per second, i.e., 250 feet (76 m) per second with a 2% tolerance. Golf balls with covers made from ionomer resins with low flexural modulus are substantially below this maximum and, as should be appreciated, all golf ball manufacturers strive to come as close as possible to this limit.

In order to approximate the characteristics of balata covered balls at a lower cost, especially their softness and "feel", the art has developed balls of a variety having cover compositions.

It is known to add a softening agent such as n- or iso-butyl-acrylate to a relatively hard ionomer in order to obtain a softer ionomer. Cover compositions can be formed from blends of such soft and hard ionomers.. As noted above, these prior art compositions have a considerably higher cut resistance and durability as compared to balata covered balls. However, despite numerous attempts to replicate the performance of balata covered balls, the golf ball cover compositions of the prior art generally suffer from low spin rates which makes them difficult to control near the greens. Further, such prior art balls tend to have relatively poor "click and feel" as compared to the balata covered balls. Additionally, many of the prior art golf ball cover compositions are low flexural modulus ionomer resins which have improved spin and feel characteristics, but relatively low velocity, which results in shorter overall distance.

Relatively recently, a number of golf ball manufacturers have introduced multilayer golf balls, i.e., balls with multiple core layers, multiple intermediate or mantle layers and/or multiple cover layers, in an effort to overcome some of the undesirable aspects of conventional two-piece balls such as their hard feel, while maintaining the positive attributes of these balls such as their increased initial velocity and distance. The physical characteristics of the cover layer and the various intermediate layers will vary depending upon the construction. Typically, one or more of the layers is softer in relation to the other layers. Examples of multilayer balls include the Episode (Titleist), Altus Newing (Bridgestone), Giga (Spalding), Metal Mix (Dunlop) and Ultra Tour Balata (Wilson).

Accordingly, there is a continuing need for new materials and additives for materials which impart desired properties, including softness, to golf ball covers and/or intermediate layers formed therefrom.

SUMMARY OF THE INVENTION

By the present invention, it has been found that golf ball cover layers and intermediate layers formed from blends containing at least one oxa acid compound exhibit improved properties, including increased softness.

In particular, the present invention is directed towards golf balls comprising at least a cover and a core wherein the cover is formed from blends comprising at least one oxa acid. Preferably, such blends contain a second component which is compatible with the oxa acid compounds such as a polyurethane, epoxy resin, polyethylene, polyamide, polyester or acid copolymers or their ionomer derivatives or blends thereof.

The present invention is still further directed towards golf balls comprising a cover, a core and at least one intermediate layer interposed between the cover and the core, wherein the intermediate layer is formed from a blend comprising at least one oxa acid compound. As with the cover layers, such blends preferably contain a polyurethane, epoxy resin, polyethylene, polyamide, polyester or acid copolymers or their ionomer derivatives or blends thereof.

The present invention is yet further directed towards a golf ball comprising a cover, a core and at least one intermediate layer interposed between the cover and the core, wherein both the cover and at least one intermediate layer are both formed from a blend comprising at least one oxa acid compound.

Having briefly summarized the invention, the invention will be described in detail by reference to the following specification and non-limiting examples.

DETAILED DESCRIPTION OF THE INVENTION

The following terms are defined as related below.

As used herein, the term "oxa acid" means a compound having the formula:

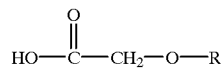

wherein R is an organic moiety selected from the group consisting of alkyl, carbocyclic, and heterocyclic groups.

As used herein, "alkyl groups" means any substituted or unsubstituted acyclic carbon-containing compound, including alkanes, alkenes and alkynes. Examples of alkyl groups include lower alkyl, for example, methyl, ethyl, n--propyl, iso-propyl, n-butyl, iso-butyl or tert-butyl; upper alkyl, for example, octyl, nonyl, decyl, and the like; and lower alkylene, for example, ethylene, propylene, propyldiene, butylene, butadiene, and the like. The ordinary skilled artisan is familiar with numerous linear and branched alkyl groups, which are within the scope of the present invention. In addition, such alkyl group may also contain various substituents in which one or more hydrogen atoms has been replaced by a functional group. Functional groups include but are not limited to hydroxyl, amino, carboxyl, amide, ester, ether, and halogen (fluorine, chlorine, bromine and iodine).

As used herein, "carbocyclic groups" means cyclic carbon-containing compounds, including but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups as described above.

As used herein, "heterocyclic groups" means closed cyclic carbon-containing compounds wherein one or more of the atoms in the ring is an element other than carbon, e.g. sulfur, nitrogen, etc, including but not limited to pyridine, pyrole, furan, thiophene, and purine.

As used herein, the term "polymer" means any type of polymer including random polymers, block polymers, etc.

In a first embodiment, this invention is particularly directed towards blends for forming golf ball covers comprising at least one oxa acid compound of the formula:

Formula I

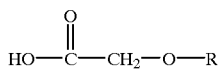

wherein R is an organic moiety selected from the group consisting of alkyl, carbocyclic, and heterocyclic groups.

Furthermore, the invention is directed towards oxa acid compounds of Formula I, wherein R has the formula:

Formula II

wherein R' is an organic moiety selected from the group consisting of alkyl, carbocyclic, and heterocyclic groups and n is an integer from 1 to 27.

Any number of oxa acid compounds of Formula I are contemplated as being useful in the present invention. Some specific oxa acids useful in the novel golf ball compositions of the present invention include 3,6-dioxaheptanoic acid having the formula:

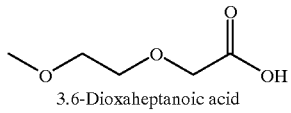

3,6-Dioxaheptanoic acid 3,6,9 trioxadecanoic acid, having the formula:

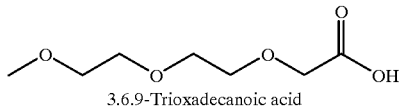

3,6,9-Trioxadecanoic acid 3,6,9-trioxaundecanedioic acid, having the formula:

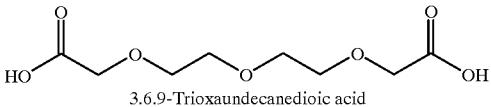

3,6,9-Trioxaundecanedioic acid and polyglycol diacid, having the formula:

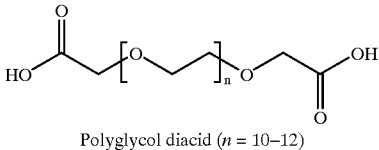

Polyglycol diacid (n = 10–12)

These oxa acid compositions possess a variety of properties which make them useful in the present blends for forming golf ball cover layers and/or intermediate layers. These properties include wide liquid ranges due to their low melting and high boiling points, high viscosity, good heat stability, solubility in media of widely differing polarity, development of surface-active properties, and good complexing properties for metal ions. These oxa acid compositions are useful as components in a number of resin compositions for positively influencing a variety of golf ball properties. Admixing oxa acids with polyesters, polyamides, polyurethanes, acid copolymers or their ionomer derivatives or epoxy resins influences properties such as elasticity to avoid or eliminate cracking, viscosity and thixotropy, heat and light resistance, dyeability, static charging, mechanical resistance, wettability, initiation of polymerization, and molecular weight.

In this first embodiment, the covers are preferably formed from a blend comprising a first component and a second component, wherein the first component comprises at least one oxa acid compound of the formula:

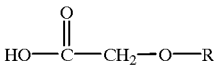

wherein R is an organic moiety selected from the group consisting of alkyl, carbocyclic, and heterocyclic groups and the second component comprises a thermoset or thermoplastic material which is compatible with the oxa acid compounds of Formula I, including but not limited to polyurethanes, epoxy resins, polyethylenes, polyamides, polyesters, and acid copolymers or their ionomer derivatives or blends thereof. Further, the first component may comprise one or more oxa acid compounds of Formula I.

Accordingly, an appropriate material or blends of materials can be selected as the second component depending upon its effect upon the desired properties of the cover composition.

In particular, a variety of acid copolymers and their ionomer derivatives are known to be useful in the present invention. Among suitable ionomers that are commercially available include those sold under the tradenames SURLYN® (DuPont) and IOTEK (Exxon).

The preferred ionomers are those available from DuPont under the tradename SURLYN®. These ionomer resins are currently available in more than fifty commercial grades, varying in composition depending on the metal ion, the amount of acid, and degree of neutralization. The different grades of material impart a variety of characteristics of cover compositions in which they are employed. Any number of these ionomers resins available from DuPont may be employed in the present invention, depending upon the desired cover composition characteristics.

These ionomers are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0–50 (preferably 0–25, most preferably 0–20), weight percent of the polymer, and Y is acrylic or methacrylic acid present in 5–35 (preferably 10–35, more preferably at least about 16–35, most preferably at least about 16–20) weight percent of the polymer, wherein the acid moiety is neutralized 1–90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/ acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/ methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art as described in e.g., U.S. Pat. No. 3,262,272.

Ionomers such as SURLYNS can be classified depending upon their acid content. High acid ionomers typically contain from about 16% to about 30%, preferably 18.5%–21.5% and most preferably about 19% by weight acrylic or methacrylic acid. Some examples of suitable high acid SURLYNS include SURLYN 8220, SURLYN 8240 and SURLYN 9220.

In contrast, SURLYN 8920 (sodium), SURLYN 9910 (zinc), and SURLYN 8940 (sodium) are all examples of SURLYNS which have 15% or less methacrylic acid. In comparing the properties of low acid SURLYNS with high acid SURLYNS, it is generally known that the high acid SURLYNS have a higher tensile yield, lower elongation, slightly higher Shore D hardness and a much higher flexural modulus.

Among the suitable ionomer resins useful in the present cover compositions is a lithium ionomer resin sold under the trade name SURLYN 7930. As noted above, SURLYN 7930 has a flexural modulus of 67,000 psi and a melt flow index of about 1.8 gm/10 min., as measured in accordance with A.S.T.M. Test D 1238, condition E, procedure A. Examples of other suitable ionomers include SURLYN 7930, 7940, 8920, 9910 and 8940.

As mentioned above, other suitable cover materials, i.e., for use in combination with the oxa acid containing materials, include polyurethanes, epoxy resins, polyethylenes, polyamides and polyesters. For example, the cover may be formed from a blend of at least one oxa acid compound and thermoplastic or thermoset urethanes/polyurethanes, urethane ionomers and urethane epoxies and blends thereof. Examples of suitable urethane ionomers are disclosed in co-pending U.S. patent application No. 08/4182,519, filed Jun. 7, 1995, entitled "Golf Ball Covers" now Pat. No. 5,692,974, the disclosure of which is hereby incorporated by reference in its entirety in the present application.

Polyurethane is a product of a reaction between a polyurethane prepolymer and a curing agent. The polyurethane prepolymer is a product formed by a reaction between a polyol and a diisocyanate. The curing agent is typically either a diamine or glycol. Often a catalyst is employed to promote the reaction between the curing agent and the polyurethane prepolymer.

Conventionally, thermoset polyurethanes are prepared using a diisocyanate, such as 2,4-toluene diisocyanate (TDI) or methylenebis-(4-cyclohexyl isocyanate) (HMDI) and a polyol which is cured with a polyamine, such as methylene dianiline (MDA), or a trifunctional glycol, such as; trimetylol propane, or tetrafunctional glycol, such as N,N,N',N'-tetrakis(2-hydroxpropyl)ethylenediamine. However, the present invention is not limited to just these specific types of polyurethanes.

Among the suitable thermoplastic polyurethanes are block copolyurethanes which typically contain blocks of a polyurethane oligomer (material with the higher softening point) alternating with lower softening point blocks of either a polyether oligomer, for a block copoly(ether-urethane), a polyester oligomer for a block copoly(ester-urethane) or a polybutadiene or hydrogenated polybutadiene oligomer for a block copoly(butadiene-urethane). The polyether oligomer is typically a polyether macroglycol, such as polytetramethylene ether glycol. The polybutadiene oligomer is a dihydroxy terminated polybutadiene oligomer, which may optionally be partially or fully hydrogenated. The polyurethane block typically consists of 4,4'-diphenylmethane diisocycanate, toluene diisocyanate (any combination of the 2,4- and 2,6- isomers) or para-phenylene diisocyanate, all chain extended with an aliphatic diol, typically 1,4-butanediol. Examples of suitable commercially available thermoplastic polyurethanes include the ESTANE® series from the B. F. Goodrich Company, which includes ESTANE® 58133, 58134, 58144 and 58311; the PELLETHANE® series from Dow Chemical, which includes PELLETHANE® 2102-90A and 2103-70A; ELASTOLLAN® from BASF; DESMOPAN® and TEXIN® from Bayer; and Q-THANE® from Morton International.

The cover may also be formed of a blend of at least one oxa acid compound and a polyamide. Among the polyamide components useful in forming the blends of this invention are nylons. The polyamide component can be comprised of a homopolymer, a copolymer, a block copolymer or a blend of two or more variations of any types of polyamides.

Polyamide homopolymers are produced by two common methods. In the first, a compound containing one organic acid-type end group and one amine end group is formed into a cyclic monomer. The polyamide is then formed from the monomer by a ring-opening addition polymerization. These polyamides are commonly designated as nylon 6, nylon 11, nylon 12, etc., where the number indicates the number of carbon atoms making up the ring in the monomer. The second method involves the condensation polymerization of a dibasic acid and a diamine. These polyamides are commonly designated as nylon 4,6, nylon 6,6, nylon 6,9, nylon 6,10, nylon 6,12, etc., where the first number indicates the number of carbon atoms connecting the two amine groups in the diamine and the second number indicates the number of carbon atoms connecting the two acid groups in the dibasic acid, including those in the acid groups.

Preferred polyamide homopolymers include nylon 4, nylon 6, nylon 7, nylon 11, nylon 12, nylon 13, nylon 4,6, nylon 6,6, nylon 6,9, nylon 6,10, nylon 6,12, nylon 12,12, nylon 13,13 and mixtures thereof. More preferred polyamide homopolymers include nylon 6, nylon 11, nylon 12, nylon 4,6, nylon 6,6, nylon 6,9, nylon 6,10, nylon 6,12 and mixtures thereof.

Polyamide copolymers are produced by several common methods. First, they are produced from addition polymerization by using two or more cyclic monomers with different numbers of carbon atoms making up each monomeric ring. Alternatively, polyamide copolymers are produced from condensation polymerization by using a single dibasic acid and two or more different diamines, each with a different number of carbon atoms separating the two amine groups, by using a single diamine and two or more different dibasic acids, each with a different number of carbon atoms separating the two acid groups, or by using two or more different diamines and dibasic acids. Additionally, polyamide copolymers are produced by blending two or more polyamide melts and holding the materials in the molten state for a sufficient time period such that partial or full randomization occurs. Polyamide copolymers are commonly designated by the separating the symbols for the homopolymers by the symbol "/". For the purposes of this application, the component named first can be either the major or a minor component of the copolymer.

Preferred polyamide copolymers include nylon 6/6,6, nylon 6,6/6,10, nylon 6/6,T wherein T represents terephthalic acid, nylon 6/6,6/6,10 and mixtures thereof.

Block polyamide copolymers are materials which contain main-chain blocks or segments of polyamide or copolyamide separated by main-chain blocks of a different polymer. The separating polymer block may be a polyether, such as a poly(alkylene oxide). When poly(ethylene oxide) is used as the separating polymer block, this material is a polyetheramide known commercially as PEBAX®, available from Elf-Atochem, GRILAMID®, available from Emser, or VESTAMID®, available from Hüls.

Epoxy resins suitable for the present invention are typically formed by the reaction of bisphenol A (b) and epichlorohydrin (a) according to the reaction set forth below:

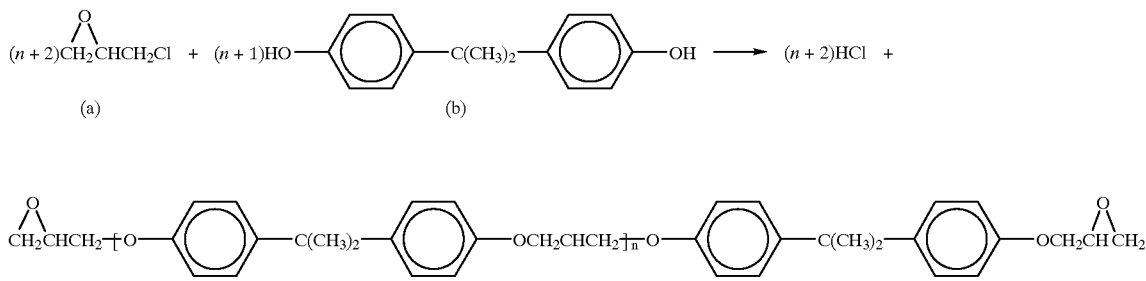

The reaction actually involves the sodium salt of bisphenol A since the polymerization is carried out in the presence of an equivalent of sodium hydroxide. The typical reaction temperatures are in the range of 50°–95° C.

Either liquid or solid prepolymers can be produced by control of molecular weight, e.g. "n" less than 1 for liquid prepolymers and "n" in the range of 2–30 for solid preploymers. The epichlorohydrin can be reacted with a variety, of hydroxy, carboxy and amino compounds to form monomers with two or more epoxide groups.

A generic representation of the structure of suitable epoxy resins is described below

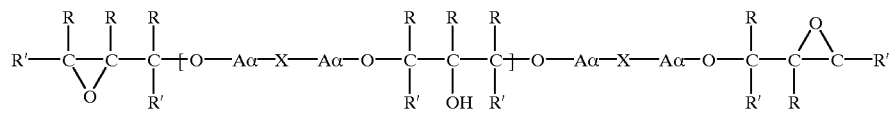

Wherein:
R, R' = H or $C_nH_{2n+1}$ where $n = 1-6$
Aα = cyclic or aromatic and may contain substituted derivatives such as acids and salts

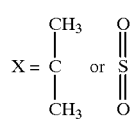

Examples of suitable commercially available epoxy resins include but are not limited to "Epon" resins available from Shell, "Novolac" resin from Dow.

As used herein, the term "polyethylene" includes homo and copolymers of ethylene containing functional groups such as maleic anhydride, carboxylic acid and hydroxy groups. For example, these functional groups are introduced by either chemical grating as in the case of grafting maleic-anhydride such as that sold commercially under the tradename "FUSABOND" by DuPont (Canada). Additionally, such functional groups can be introduced by copolymerizing the ethylene monomer with am unsaturated carboxylic acid comonomer such as a methacrylic acid sold commercially under the tradename "NUCREL" by DuPont.

Homo and copolymers of polyethylenes employed in the present invention can be produced by well known free radical and ionic polymerization methods, including those employing a metallocene based catalyst. A general representation of the structure of polyethylenes suitable for the present invention is:

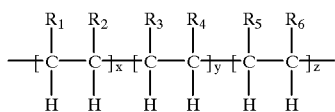

Wherein:
$R_1$ is hydrogen;
$R_2$ $R_3$ $R_5$ and $R_6$ in H or $C_nH_{2n+1}$ where $n = 1-5$
$R_4$ is H, $C_nH_{2n+1}$ where $n = 1-12$, phenyl,
carbocyclic, OH, COOH, $NH_2$ The polyesters suitable for use in the present invention can be produced by direct esterification of a diacid with a diol (as set forth below) or self-condensation of a hydroxy carboxylic acid. For example, a reaction of diacylchloride with a diol(s) at lower temperatures can be used to produce polyesters.

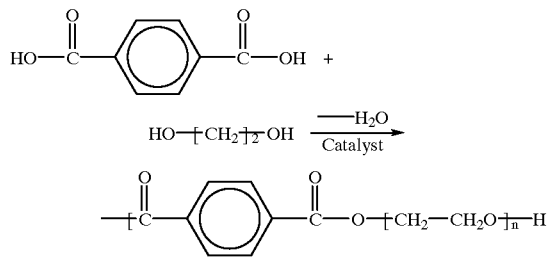

Catalysts such as manganese acetate, antimony oxide and titanium alkoxides are commonly used in the polymerization to produce polyesters. A generic representation of the structure of suitable polyesters is set forth below.

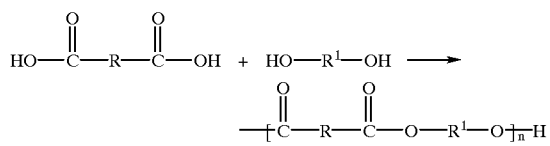

wherein: R = substituted and unsubstituted cyclocliphatic or aromatic;
$R^1$ = aliphatic or aromatic (e.g. bisphenol-A or bispherol-S); and $n > 50$ Examples of suitable commercially available polyesters include materials sold under the tradenames "Eastpak" PET polyester and "Eastar" PETG from Eastman Chemicals, "POCAR" PBT polyester from Hoechst Celanes and "Dacron" and "Terglene" from DuPont just to name a few.

Additionally, polyester elastomers such as polyester ether materials sold commercially by DuPont under the tradename "Hytrel" are also suitable materials.

The covers of the present invention are formed from a blend comprising up to about 90, preferably up to about 50, more preferably about 0.10 to about 25 and most preferably about 0.20 to about 20 percent by weight of a first component comprising at least one oxa acid composition or mixtures thereof, and at least about 10, preferably at least about 50, more preferably about 99.90 to about 75 and most preferably about 99.80 to about 80 percent by weight of a second component, preferably a polyurethane, polyethylene, epoxy resin, polyamide, polyester or an acid copolymer or its ionomer derivative or mixtures thereof.

The present cover compositions can be used in golf balls of any size. Although the United States Golf Association (USGA) specifications limit the minimum size of a competition golf ball to more than 1.680 inches in diameter, golf balls of any size can be used for recreational play. The preferred diameter of the golf balls is from about 1.680 inches to about 1.800 inches. The more preferred diameter is from about 1.680 inches to about 1.760 inches. A diameter from about 1.680 inches to about 1.740 inches is most preferred. Oversized golf balls above about 1.760 inches to game bells as big as softballs are also contemplated by the present invention.

Likewise, the present cover blends can be used in any type of golf ball. In particular, the present cover blends can be used in two-piece golf balls wherein a cover surrounds a core material. Further, the present cover blends are also useful in wound golf balls, in which a liquid, semi-solid or solid core is surrounded by a winding of an elastic material and the wound core is then covered with a cover. Additionally, the cover blends can be employed to form covers on multilayer golf balls which are described in greater detail above. Typically, golf balls have a cover with a thickness; of about 0.04 inches to about 0.10 inches.

Golf balls of the invention which employ cover blends comprising oxa acids are made in a conventional manner by molding the cover stock material around a core. Further, the cover stock material may include a variety of additional compound, such as whitening agents such as titanium dioxide; dyes; UV absorbers; optical brighteners; and other additives which are conventionally included in golf ball covers.

The present compounds may be blended using any conventional blending technique. For example, the oxa acids may be added to a vessel containing pelletized ionomer resins and heated to 300° F.–500° F. Thorough mixing of the materials is accomplished by means of a screw in the heated vessel. Typically, the covers are formed around the solid or wound cores by either compression molding preformed half-shells of the cover stock material or by injection molding the cover stock about the core. The preferred method is compression molding of preformed half-shells.

In compression molding, the half-shells of the stock material are made by injection molding the cover stock material into a conventional half-shell mold at 300° F.–500° F. The preformed half-shells are placed around a core to provide an assembly which is introduced into a conventional compression molding machinery such as that shown in U.S. Pat. No. 4,508,309. The ball is allowed to cool in the mold until the cover is hard enough to be handled without deforming. The balls then undergo conventional finishing operations such as buffing, painting and stamping. This type of cover construction is generally referred to as a two-piece cover.

Alternatively, golf balls can be covered solely by an injection molding technique. In injection molding, an injection molding machine is utilized in which the core assembly is placed in a mold cavity. The core assembly is held in place through the use of several retractable pins. Such injection molding machines are well known in the art. The molten cover material is injected into the cavity surrounding the core. As the cover material cools and hardens, the pins retract and the molded ball is ejected from the mold. The balls then undergo conventional finishing operations such as buffing, painting and stamping. This type of cover construction is generally referred to as a one-piece cover.

In a second embodiment, a golf ball of the present invention comprises a multilayer golf ball with at least one intermediate layer interposed between the cover and the core, wherein the intermediate layer(s) is formed from a blend which comprises at least one oxa acid composition.

Such multilayer balls may be of any one of a number of constructions. For example, such balls may have a dual cover construction wherein a conventional core is surrounded by an inner cover layer and an outer cover layer. Additionally, and/or alternatively, the multilayer ball may also contain a mantle layer disposed between the core layer and cover layer(s). Further, such mantle layer and/or core layers may also comprise a plurality of layers. By the present invention, it is contemplated that any such intermediate layers, including those having more than one layer, may be formed from a blend which comprises at least one oxa acid of Formula I.

In this embodiment of the invention, the intermediate layer may be formed from a blend having at least a first component which comprises at least one oxa acid of Formula I and a second component of a material which is compatible with the oxa acids of Formula I. As with the cover layer, among the suitable materials for the second component of the blend for the intermediate layer are polyurethanes, epoxy resins, polyethylenes, polyamides, polyesters, and an acid copolymer or its ionomer derivatives or blends thereof as disclosed above. Additional materials that are suitable as the second component in blends with oxa acids for forming an intermediate layer include but are not limited to dynamically vulcanized elastomers, functionalized styrene-butadiene elastomers and metallocene-catalyzed polymers.

Suitable dynamically vulcanized elastomers include Santoprene®, specifically Santoprene® 203-40 which is a dynamically vulcanized PP/EPDM commercially available from Advanced Elastomer Systems. Examples of suitable functionalized styrene-butadiene elastomers include Kraton FG-1901x and FG-1921x which are commercially available from the Shell Corporation. Metallocene-catalyzed polymers include any polymer, copolymer or terpolymer formed using a metallocene catalyst. Suitable metallocene-catalyzed polymers are commercially available under the names AFFINITY®, INSIGHT®, ENGAGE® from Dow Plastics and EXACT® from Exxon Corp. Metallocene polymers are also available from Sentinel Products Corp. (Hyannis, Mass.) in either a foamed or unfoamed form.

The intermediate layers of the present invention are formed from a blend comprising up to about 90, preferably up to about 50, more preferably about 0.10 to about 25 and most preferably about 0.20 to about 20 percent by weight of a first component of an oxa acid composition of Formula I or mixtures thereof and at least about 10, preferably about 50, more preferably about 99.90 to about 75 and most preferably about 99.80 to about 80 percent by weight of a second component.

Additionally, in this second embodiment of the invention, the cover layer may also be formed from a blend which comprises at least one oxa acid compound as described with regard to the first embodiment. The intermediate and cover layers may be formed from blends comprising the same oxa acid compound or may contain different oxa acid compounds.

The multilayer balls of the second embodiment can be made by any conventional manufacturing processes, including compression molding, injection molding or casting of the various layers about a core and/or one another. The cover layer is subsequently injection molded, compression molded or cast about the outermost intermediate layer.

Numerous oxa acid compounds useful in the cover intermediate layer blend compositions of the present invention are available from Hoechst Celanese Corporation, Fine Chemicals Division under the trade name "Oxa Acids." See Hoechst Celanese Corporation's "Oxa Acids" Brochure (1994).

Additionally, the oxa acid compounds can be synthesized by a variety of synthetic routes known to the skilled organic chemist. It is well known in the art of organic synthesis that many different synthetic protocols can be used to prepare a given compound. Different routes can involve more or less expensive reagents, easier or more difficult separation or purification procedures, straightforward or cumbersome scale-up, and higher or lower yield. The skilled synthetic organic chemist knows well how to balance the competing characteristics of synthetic strategies. Thus the compounds of the present invention are not limited by the choice of synthetic strategy, and any synthetic strategy that yields the compounds described above can be used.

EXAMPLES

The following examples are given to illustrate the novel golf ball cover compositions of the present invention. It is to be understood, however, that the invention is not limited to the formulation described in the examples.

Example 1

In order to exemplify the effects of oxa-acid compounds blended with golf ball cover materials, an amount of oxa acid compound was mixed with SURLYN 7930 in a twin screw extruder. The exact amount of each component of the blend, the flexural modulus and the Shore-D Hardness are set forth in Table I below.

TABLE I

| % Surlyn 7930/ % Oxa Acid | Flex Modulus (KPSI) | Shore-D Hardness |
| --- | --- | --- |
| 100% Surlyn 7930 | 67 | 68 |
| 96.7% Surlyn 7930 3.6% 3,6,9, Trioxadecanoic Acid | 49.3 | 67.2 |
| 93.4% Surlyn 7930 6.6% 3,6,9, Trioxadecanoic Acid | 13.9 | 55.2 |
| 96.7% Surlyn 7930 3.3% 3,6 Dioxaheptanoic Acid | 47.4 | 67.3 |
| 93.4% Surlyn 7930 6.6% 3,6 Dioxaheptanoic Acid | 12.1 | 54.2 |

Shore D Hardness was measured using an apparatus known as a Shore-D Meter 2000 and a Automatic Stand Model 902. The meter is turned on and allowed to stabilize for 5 minutes. The meter was then calibrated with a rectangular metal standard to read 99.9. The testing time was set at one second as per ASTM D2240. Three flex bars were measured six times and averaged to get the value reported in Table I.

Flexural modulus was then measured by determining the dimensions of the bars using well known computer calculations and then using ASTM Method D790. Five bars were tested and averaged to provide the final value appearing in Table I. The test speed was 0.2 in/min. The flex bars detailed above were allowed to condition for 48 hours prior to testing.

As can be seen from the examples and results in Table I, oxa acids employed in golf ball cover blends according to the present invention can be used to lower the flexural modulus and the shore D of golf ball covers while still obtaining balls having satisfactory performance.

Example 2

In order to ascertain the impact of oxa acid compositions on polyamides, an oxa acid was added in two different amounts to a Nylon 12 composition. The materials were blended in a Brabender batch mixer and used to form a test bar of the resulting polymer. The melting point of the test bar was analyzed to determine the effect of the oxa acid on the melting point of the polymer. The amount of oxa acid 3,6 dioxaheptanoic acid and the resulting melting points are set forth in Table II below.

TABLE II

| Blend Composition | Melting Point |
| --- | --- |
| Nylon 12 | 176.7° C. |
| Nylon 12 + 2.5% 3,6 dioxaheptanoic acid | 175.3° C. |
| Nylon 12 + 10% 3,6 dioxaheptanoic acid | 171.3° C. |

As illustrate above, the blends containing oxa acids exhibited a lower melting point than Nylon 12 alone. In particular, the addition of 10% oxa acid resulted in a decrease in melting point of more than 5° C. One of ordinary skill in the art would readily recognize that the oxa acid compounds are intimately mixing and reacting with the Nylon 12.

Moreover, skilled artisan would recognize that the reduced melting point of the Nylon 12 blends containing the oxa acids would result in a softer final polymer composition, thereby indicating that oxa acid compositions are useful as softening agents for polyamide compositions such as Nylon 12.

While it is apparent that the illustrative embodiments of the invention herein disclosed fulfills the objectives stated above, it will be apparent that numerous modifications and other embodiments may be devised by those skilled in the art. Therefore, it will be understood that the appended claims are intended to cover all such modifications which come within the spirit and scope of the present invention.

What is claimed is:

1. A golf ball comprising a cover, a core, and, optionally an intermediate layer interposed between the cover and the core, wherein at least one of the cover and the optional intermediate layer is formed from a blend which comprises at least a first component and a second component, wherein:

(a) the first component comprises at least one compound having the formula:

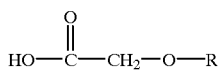

wherein R is an organic moiety selected from the group consisting of moieties having the formula —[CH$_2$—CH$_2$—O]$_n$—R' and alkyl, carbocyclic, and heterocyclic groups, wherein R' is an organic moiety selected from the group consisting of alkyl, carbocyclic, carboxylic acid, and heterocyclic groups, and n is at least 1; and (b) the second component is a compound selected from the group consisting of poly(amide-ether) block copolymers, poly(amide-ester) block copolymers, poly(ether-ester) block copolymers, poly(ester-ester) block copolymers, maleic anhydride grafted metallocene catalyzed copolymers, and blends thereof.

2. The golf ball according to claim 1, wherein the blend further comprises a component selected from the group consisting of ionomers, acid copolymers, acrylate copolymers, methacrylate copolymers, density modifying fillers, and blends thereof.

3. The golf ball according to claim 1, wherein the blend has a hardness of from about 45 to about 70 shore D and a flexural modulus of from about 20 to about 100 kpsi.

4. The golf ball according to claim 1, wherein R has the formula:

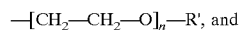

R' is an organic moiety selected from the group consisting of alkyl, carbocyclic, carboxylic acid, and heterocyclic groups, and n is at least 1.

5. The golf ball according to claim 4, wherein R' has the formula:

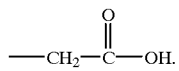

6. The golf ball according to claim 5, wherein n is an integer between 1 and 27.

7. The golf ball according to claim 4, wherein R' is a methyl group.

8. The golf ball according to claim 1, wherein the first component is present in an amount of about 0.1 to about 90 weight percent and the second component is present in an amount of at least about 10 weight percent.

9. The golf ball of claim 1, wherein the first component is present in an amount of about 0.1 to about 50 weight percent and the second component is present in an amount of at least about 50 weight percent.

10. The golf ball according to claim 1, wherein the blend comprises about 0.10 to about 25 weight percent of the first component and about 99.9 to about 75 weight per(cent of the second component.

11. The golf ball of claim 1, wherein the blend comprises about 0.2 to about 20 weight percent of the first component and about 99.8 to about 80 weight percent of the second component.

12. The golf ball of claim 1, wherein the core is a liquid, semi-solid, or sold core, surrounded by a winding of elastic material.

13. A method for forming a golf ball comprising a cover and a core comprising, the method comprising:

(a) forming a golf ball core;

(b) forming a cover blend comprising a first component and a second component, wherein the first component comprises at least one compound having the formula:

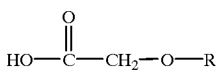

wherein R is an organic moiety selected from the group consisting of moieties having the formula —[CH$_2$—CH$_2$—O]$_n$—R' and alkyl, carbocyclic, and heterocyclic groups, wherein R' is an organic moiety selected from the group consisting of alkyl, carbocyclic, carboxylic acid, and heterocyclic groups, and n is at least 1, and a second component; and the second component is selected from the group consisting of poly(amide-ether) block copolymers, poly(amide-ester) block copolymers, poly(ether-ester) block copolymers, poly(ester-ester) block copolymers, maleic anhydride grafted metallocene catalyzed copolymers, and blends thereof; and (d) forming a cover by molding said cover blend around the golf ball core to form a golf ball.

14. The method of claim 13, which further comprises forming an intermediate layer around the core prior to forming the cover.

15. The method of claim 13, which further comprises selecting a compound for the first component wherein R has the formula:

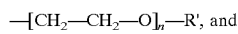

R' is an organic moiety selected from the group consisting of alkyl, carbocyclic, carboxylic acid, and heterocyclic groups, and n is an integer greater than 1.

16. The method of claim 13, further comprising forming the cover blend, such that the cover blend comprises from wherein the cover blend comprises about 0.2 to about 20 weight percent of the first component and about 99.8 to about 80 weight percent of the second component.

17. A method for making a multilayer golf ball comprising a cover, a core, and an intermediate layer interposed between the cover and the core, the method comprising:

(a) forming a golf ball core;

(b) forming a blend comprising at least a first component and a second component, wherein the first component comprises at least one compound having the formula:

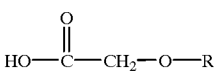

wherein R is an organic moiety selected from the group consisting of moieties having the formula —[CH$_2$—CH$_2$—O]$_n$—R' and alkyl, carbocyclic, and heterocyclic groups, wherein R' is an organic moiety selected from the group consisting of alkyl, carbocyclic, carboxylic acid, and heterocyclic groups, and n is at least 1, and the second component is a compound selected from the group consisting of poly(amide-ether) block copolymers, poly(amide-ester) block copolymers, poly(ether-ester) block copolymers, poly(ester-ester) block copolymers, maleic anhydride grafted metallocene catalyzed copolymers, and blends thereof;

(c) molding the blend around the golf ball core to form the intermediate layer; and (d) molding a cover around said intermediate layer to form a golf ball.

18. The method of claim 17, which further comprises selecting a first component for the intermediate layer blend comprising at least one compound having the formula:

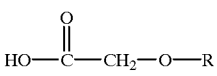

wherein R is —[CH$_2$—CH$_2$—O]$_n$—R' wherein R' is an organic moiety selected from the group consisting of alkyl, carbocyclic, carboxylic acid, and heterocyclic groups, and n is at least 1.

* * * * *